United States Patent Office 3,481,892
Patented Dec. 2, 1969

3,481,892
WATER SOLUBLE OIL MODIFIED ALKYD RESIN
Ching Yun Huang, Minoo-shi, and Shoji Kizaki, Suita-shi, Japan, assignors to Japan Gas-Chemical Company, Inc., Tokyo, Japan, a corporation of Japan
No Drawing. Filed July 28, 1966, Ser. No. 568,393
Claims priority, application Japan, July 29, 1965, 40/46,063
Int. Cl. C08g *17/16;* C09d *3/64*
U.S. Cl. 260—22                                10 Claims

ABSTRACT OF THE DISCLOSURE

Novel water soluble oil modified alkyd resins containing as the polyol component less than 50 weight percent of a condensation product of an aromatic hydrocarbon-formaldehyde resin and a polyhydric alcohol in an amount sufficient to provide a total weight of hydroxyl groups at least 1.3 times the total weight of oxygen in the aromatic hydrocarbon-formaldehyde resin.

---

This invention relates to a water soluble resin, particularly relates to a water soluble oil modified alkyd resin which contains essentially a condensation product between aromatic hydrocarbon-formaldehyde resin (hereinafter referred to as hydrocarbon resin) and polyhydric alcohol. This invention also relates to a process for producing such a water soluble resin, wherein a mixture of hydrocarbon resin and aliphatic polyhydric alcohol is heated in the presence of acid catalyst to produce resinous reaction product, this resinous product, drying or semidrying oil or fatty acid thereof, $\alpha$, $\beta$ unsaturated polybasic acid and, if desired, aliphatic or aromatic polybasic acid are mixed together, then this mixture is heat reacted to obtain a resin having a high acid value more than 30, and this high acid value resin is neutralized with alkali or water soluble amines. This resin is used as water soluble baking varnish, or electrodeposition varnish.

Water soluble alkyd resins are well known resins which are used as water soluble baking varnish. This type of alkyd resin is generally produced by the neutralization of so called high acid value alkyd resin with alkali or amines. This high acid value alkyd resin has a higher content of hydrophilic groups such as free hydroxy and carboxy groups than the usual alkyd resin of solvent type. In the production of the high acid value alkyd resin, the reaction must be stopped before the completion of the esterification reaction, because many carboxy groups must be left unreacted. Thus, it is very difficult to control the reaction and is not easy to manufacture products having a definite quality. Further, in order to produce the resin of high molecular weight, much of polyfunctional monomers such as trimellitic anhydride and pentaerythritol is required to be used. The use of those monomers may raise the trouble of premature gelation. Still further, the coated film of the resin is poor in water and chemical resistance and anti-corrosive effect of metals, because the resin has much free hydroxy and carboxy groups.

The present inventors have now succeeded in the production of water soluble alkyd resins which have little tendency of gelation during the reaction, easy control of the reaction and excellent performance, by employing the reaction product between hydrocarbon resin and polyhydric alcohol as the alcohol component of the alkyd resin.

The condensation reaction to produce resinous material between hydrocarbon-resin and alcohol under the presence of acid catalyst is well known. However, this resinous product mixed with organic carbonic acid can be heated to produce esters. Thus, the hydrocarbon resin-polyhydric alcohol condensation product, even if having no free hydroxy groups in the molecule, can be utilized as a polyhydric alcohol component of alkyd resin. The reaction mechanism for producing alkyd resin by using hydrocarbon resin-polyhydric alcohol condensation product is entirely different from that for usual alkyd resin. In the former case polyfunctional monomers such as trimellitic anhydride and pentaerythritol can be used with little occurrence of gelation during the reaction. In some cases alkyd resins which have no free hydroxy group can be produced.

As to the performance of the resin coating varnish which is produced from the alkyd resin according to the present invention, following Table I is referred to. In the table Examples 1, 2 and 3 concern resin coating materials produced according to the methods described Examples 1, 2 and 3, respectively. From the table it is clearly shown that resistance to water and boiling water, resistance to chemical reagents such as alkalis and acids, salt spray test, hardness, adhesion, impact resistance, and gloss of the coated film produced from the resins of the present invention are superior to those from the conventional alkyd resin and it is also shown that the water soluble resin of the present invention can form more excellent films than that formed by the conventional alkyd resin.

TABLE I.—PROPERTIES CHART OF VARIOUS WATER SOLUBLE ALKYD RESINS

| Test items | Example 1 | Example 2 | Example 3 | Conventional water soluble alkyd resin using trimeritic acid |
|---|---|---|---|---|
| Coating method | Flow coat | Flow coat | Electrodeposition | Flow coat. |
| Baking condition | 180° C., 20 minutes | 150° C., 30 minutes | 150° C., 30 minutes | 150° C., 30 minutes. |
| Film thickness (micron) | 25–30 | 25–30 | 25 | 25–30. |
| Pencil hardness | H | 2H | 2H | HB. |
| Gloss | Good | Good | Good | Good. |
| Flexibility (3 mm. mandrel bend) | Pass | Pass | Pass | Crack. |
| Erichsen test (mm.) | Over 7 mm | Over 7 mm | Over 7 mm | 5.5 mm. |
| Impact test (500 g.) | 50 cm | 50 cm | 40 cm | 30 cm. |
| Cross cut | 100/100 | 100/100 | 100/100 | 100/100. |
| Water resistance (7 days) | Good | Good | Good | Slightly blistering. |
| Boiling water resistance (2 hrs.) | Slightly blistering | do | do | Blister. |
| Salt spray resistance (150 hrs.) | Good | do | do | Poor. |
| Alkali resistance (5% NaOH, 24 hrs.) | Slightly blistering | do | do | Blistering, spalling. |
| Acid resistance (5% HCl, 24 hrs.) | Good | do | do | Blistering. |
| Soap resistance (0.5% soap, 72 hrs.) | do | do | do | Good. |
| Weather-resistance (500 hrs. Weatherometer exposure) | do | do | do | Do. |

Now the process for making resins according to the present invention will be described. First an aromatic hydrocarbon resin and a polyhydric alcohol are reacted in the presence of an acid catalyst at a predetermined temperature and for a predetermined time to produce a resinous product. This resinous product is then mixed with one or more drying oils, semidying oils or fatty acids thereof, one or more α,β unsaturated polybasic acids, and if desired, one or more polybasic acids. This mixture is heated to react together. This step of the process is a so-called esterification reaction step. With the advance of the reaction, the acid value of the resin decreases. When this value reaches a predetermined value, heating of resin is stopped and the resin is cooled. When the resin is cooled to a suitable temperature, alkali or amines and alcohols are added, resulting in the water soluble resin of the present invention. By further dilution of the resin with water, water soluble resin varnish is produced. Alternatively, before the neutralization by amines, some thermosetting resin as described below may be added to and precondensed with the resin, or the thermosetting resin may be merely blended with the resin after the neutralization by amines.

Aromatic hydrocarbon-formaldehyde resins or hydrocarbon resins which can be used in this invention include liquid to solid resins which are produced by the condensation polymerization under the presence of an acid catalyzer such as sulfuric acid, between formaldehyde or paraformaldehyde and an aromatic hydrocarbon selected from the group consisting of benzene, toluene, xylenes, mesitylene, durene, ethylbenzene, isopropylbenzene, cymene, naphthalene, methylnaphthalene and so on which can be signified by the following formulas:

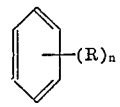

or

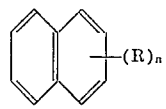

wherein R is —CH$_3$, —CH$_2$·CH$_3$, —C$_3$H$_7$, etc. and $n$ is 0 or an integral number 1 to 4. These resins are high molecular compounds which have three kinds of bondage between aromatic nuclei such as methylene (—CH$_2$—), methylene-ether (—CH$_2$—O—CH$_2$—), and acetal

bonds and have partly methylol (—CH$_2$OH) group.

Polyhydric alcohols which can be used in the present invention include polyhydric alcohols having free hydroxy groups of two or more carbon atoms in their molecules such as ethyleneglycol, polyethyleneglycols, propyleneglycol, polypropyleneglycols, butyleneglycol, polybutyleneglycols, neopentylglycol, glycerin, trimethylolethane, trimethylolpropane, pentaerythritol, dipentaerythritol, sorbitol and manitol. Particularly to make easily soluble in water, it is preferable to use polyetherpolyols such as polyethyleneglycols or polypropyleneglycols as a part of polyhydric alcohols.

Hydrocarbon resin-polyhydric alcohol condensation product which is suitably employed in the present invention can be produced by heating a mixture consisting of hydrocarbon resin and polyhydric alcohol at a temperature between 150° and 230° C. for about 0.5 to 5 hours in the presence of inorganic or organic acid catalyst such as hydrochloric acid, paratoluenesulfonic acid and xylenesulfonic acid, said acid catalyzer being used in an amount of 0.1 to 1.0% based on the weight of said hydrocarbon resin. Lesser amounts of the catalyzer for this reaction is not sufficient for fully reacting hydrocarbon resin with polyhydric alcohol, while excess of the catalyzer darken the color of the product. The amount of polyhydric alcohol to be reacted depends on the particular kind and quantity of vegetable oils, α,β unsaturated polybasic acids and saturated polybasic acids, which are used in the following step. However, in any case, more than 130% by weight of hydroxy groups in the total alcohol to be reacted based on the weight of oxygen contained in the hydrocarbon resin. That is, the total hydroxyl weight must be at least 1.3 times the total weight of oxygen in the aromatic hydrocarbon-formaldehyde resin. When lesser amounts of polyhydric alcohol is used, there will be the possibility of leaving much starting materials unreacted and because of the low molecular weight of the resin produced, the film from this resin tends to have poor properties. The hydrocarbon resin-polyhydric alcohol-condensation product must be used in a quantity less than 50 wt. percent of the final product of high acid value alkyd resin, otherwise the water solubility of the alkyd resin will be poor. Most suitable drying or semidrying vegetable oil and fatty acid for the present invention is any one of or a mixture of linseed oil, safflower oil, dehydrated castor oil, soyabean oil, and their fatty acids. However, any one of or a mixture of, tung oil, oiticica oil, castor oil and their fatty acids and also unsaturated fatty acids such as oleic acid, may be used. Furthermore, addition products of hereafter described α,β unsaturated polybasic acids to above said drying, semidrying vegetable oils or their fatty acid, for example, maleic oils or maleic fatty acids, may be used. A suitable amount of above described vegetable oils or fatty acids in the produced resin is 30–70 wt. percent of the resin.

α,β unsaturated polybasic acids which are required for the present invention include maleic anhydride, fumaric acid, itaconic acid, 3,6 endomethylene-1,2,3,6-tetrahydro-cis-phthalic anhydride, etc. Suitable amounts used are from 5 to 50 parts (by weight) based on 100 parts (by weight) of the vegetable oil or fatty acid. Excess of α,β unsaturated polybasic acid has a tendency to prompt gelation during the reaction. If desired, aromatic polybasic acids such as phthalic anhydride, isophthalic acid, terephthalic acid, trimellitic anhydride, and aliphatic polybasic acids such as succinic acid, adipic acid, azelaic acid, and sebasic acid, may be used along with said α,β unsaturated polybasic acids. However, such polybasic acid must not be used in an amount exceeding 30 weight percent of the total weight of resulting high acid value alkyd resin.

Thus, employing hydrocarbon resin-polyhydric alcohol condensation product as fully described above, drying or semidrying vegetable oil or their fatty acid, α,β unsaturated polybasic acid, and if desired, aliphatic and aromatic polybasic acid, the water soluble resin of the present invention can be produced under substantially the same conditions as those of conventional procedures for the usual alkyd resins. Usually, reaction temperature varies between 180° and 260° C., and reaction time between 0.5 and 5 hours. Acid value of the resulting resin must be controlled to a value between 30 to 100, because a resin having an acid value less than 30 is poor in water solubility and a resin of more than 100 has undesirable effects on properties of the film therefrom.

In order to make the thus produced resin soluble in water, it is necessary to neutralize the resin with alkali or water soluble amines. The neutralization may be practiced after dissolving the resin with alcohols or cellosolves which can be miscible with water in any ratio. Alternatively, after neutralizing the resin, it may be dissolved with alcohols or cellosolves, and then diluted with water providing water soluble resin. Representative alkali used for the neutralization of the resin is ammonium hydroxide. Water soluble amines useful for the neutralization of the resin include methylamine, dimethylamine, trimethylamine, ethylamine, diethylamine, triethylamine, ethanolamine, diethanolamine, triethanolamine, morpholine and so on. They should be used in amounts, as calculated chemical equivalent, somewhat in excess of the chemical equivalent of carboxy groups in the resin. Alcohols and cellosolves which are added as assistants for the solubilization in water include alcohols such as ethylalcohol, isopropylalcohol, and tertiary butylalcohol, and glycol derivatives such as methylcellosolve, ethylcellosolve, and butylcellosolve. Such assistants may be used in any amount more than the minimum sufficient for solubilization in water.

Water soluble resin according to the present invention can be directly used as a baking varnish. However, in order to increase, when cured, the curing rate and to improve properties of the coated film, one or more of the water soluble thermosetting resins, for example, resol type phenolic resin, and etherized amino resin such as melamine or urea resin etherized with alcohols having carbon atoms of 3 or less, may be either precondensated with the present resin before the neutralization with amines, or blended with after the neutralization. Thus, water soluble resin coating material with better film forming properties can be made.

Following examples will more fully illustrate the present invention. Parts in the examples are all by weight unless otherwise specified.

EXAMPLE 1

100 parts of xylene-formaldehyde resin (M.W. 490, oxygen content 11.5%), 30 parts of pentaerythritol, 40 parts of polyethyleneglycol (M.W. 400), and 0.2 part of paratoluenesulfonic acid were mixed. The mixture was heated, while stirring, at 180° C. for 1 hour to obtain 155 parts of liquid resin. This resin, 100 parts of linseed oil fatty acid, and 25 parts of maleic anhydride were mixed, and then the mixture was heated, while stirring, at 230° C. for 1 hour to obtain 265 parts of resin with acid value of 45.5. After cooling this resin to a temperature between 60° and 80° C., 65 parts of ethylcellosolve was added to dissolve the resin thoroughly. And then 40 parts of morpholine was added to neutralize the resin solution. Finally, 240 parts of water was added to obtain 610 parts of water soluble resin which had 45.7% of non-volatile material, viscosity $Z_4$ (by Gardner's air-bubble viscometer at 25° C.), color number 10 (Gardner), and pH 8.2. This water soluble resin added with water dispersible Mn dryer (Mn 10%) in the proportion of 1 part per 100 parts of the former was diluted with water to a suitable viscosity and then flow coated on a test panel. This test panel was baked at 180° C. for 20 min. Transparent film on the panel which was hard, and good in gloss, water resistance, boiling water resistance and chemical resistance, was gained.

EXAMPLE 2

162 parts of toluene-formaldehyde resin (M.W. 400, oxygen content 9.5%), 50 parts of pentaerythritol, 45 parts of polypropylene glycol (M.W. 600) and 0.3 part of paratoluenesulfonic acid were mixed together. The mixture was heated, while stirred, at 200° C. for one and half hours to produce 236 parts of a resin. To this resin, 130 parts of linseed oil, 70 parts of dehydrated castor oil, 72 parts of maleic anhydride, and 35 parts of phthalic anhydride, were added. This mixture was heated, while stirred, at 250° C. for 3 hours to produce 516 parts of a resin with acid value of 58.2. After cooled to a temperature between 60° and 80° C., the resin was mixed with 70 parts of butylcellosolve, 50 parts of isopropylalcohol, 32 parts of 28% ammonia solution, and 575 parts of water at one time, and stirred thoroughly resulting in 1243 parts of the water soluble resin. This resin which is used as coating material had 45.1% of non-volatile material, viscosity between Y and Z (by Gardner's air-bubble viscometer at 25° C.), color number 13 (Gardner) and pH 8.7. 70 parts of this water soluble resin coating material was mixed with 20 parts of isopropyletherized-melamine resin (non-volatile content 70) followed dilution with water to a suitable viscosity, and then flow coated on a test panel. The panel was baked at 150° C. for 20 minutes. Thus, a panel coated with a transparent hard film with good gloss, flexibility, and adhesion, and resistance to water, and chemical reagents was obtained.

EXAMPLE 3

60 parts of xylene-formaldehyde resin (M.W. 455, oxygen content 12.0%), 20 parts of polyethyleneglycol (M.W. 600), 20 parts of sorbitol, 10 parts of trimethylolpropane, and 0.1 part of xylenesulfonic acid were mixed together, and the mixture was heated, while stirred, at 200° C. for 1 hour to obtain 98 parts of a resinous product. To this product 100 parts of maleic oil which was obtained by the addition of 30% maleic anhydride to linseed oil, and 20 parts of trimellitic anhydride were added. This mixture was heated, while stirred, at 180° C. for two and a half hours to obtain 205 parts of a resin with acid value of 58. After cooled to a temperature lower than 80° C., the resin was mixed with 150 parts of resol type phenolic resin varnish (non-volatile content 50%) and heated at 90°–100° C. for 1 hour. After cooled to this precondensate 50 parts of isopropylalcohol, 45 parts of 40% dimethylamine solution in water, and 150 parts of water were mixed to obtain 600 parts of water soluble resin which had 47.8% of non-volatile material, viscosity $Z_4$ (by Gardner's air-bubble viscometer at 25° C.), color numer 15 (Gardner) and pH 8.5. Employing this resin diluted to the solution of 15% non-volatile material, and an iron plate to be coated and under the operating conditions of 15 cm.$^2$ area to be coated (one surface), 10 cm. of electrodes distance, 20° C. of bath temperature, and 30 v. of electrolysis voltage, electrodeposition of the iron plate with the resin was carried out. The plate was then baked at 150° C. for 30 minutes. Thus, transparent resin coating (film thickness of 25 mircons) of good hardness, gloss, adhesion, and resistance to water and chemical reagents was obtained.

EXAMPLE 4

50 parts of trimethylbenzene-formaldehyde resin (M.W. 430 oxygen content 8.5%), 20 parts of polypropyleneglycol (M.W. 1000), 25 parts of dipentaerythritol, 10 parts of glycerin and 0.1 part of paratoluenesulfonic acid were mixed and the mixture was heated, while stirred, at 200° C. for 2 hours to obtain 97 parts of resinous product. This resinous product, 30 parts of linseed oil fatty acid, 30 parts of soyabean oil fatty acid, 15 parts of maleic anhydride and 10 parts of phthalic anhydride were mixed, and the mixture was heated at 230° C. for 5 hours to obtain 175 parts of resin having acid value of 46.6. After cooled the resin was mixed with 38 parts of diethanolamine, 30 parts of butylcellosolve, and further added with 170 parts of water and 63 parts of isopropyletherized melamine resin (70% solution in isopropylalcohol) to produce 476 parts of water soluble resin having 50.2% of non-volatile material, viscosity $Z_3$ (by Gardner's air-bubble viscometer at 25° C.), color number 12 (Gardner) and pH 7.9. This resin which was used directly as coating material was electrodeposited under the similar conditions described in Example 3, and baked at 150° C. for 30 minutes. Transparent coated film with good hardness, gloss, adhesion, flexibility and resistance to water and chemical reagents was obtained.

EXAMPLE 5

70 parts of naphthalene-formaldehyde resin (M.W. 570, oxygen content 7.2%), 15 parts of glycerin, 7 parts of pentaerythritol, and 0.1 part of paratoluenesulfonic acid were mixed together, and then the mixture was heated at 220° C. for 2 hours to produce 92 parts of resinous product. To this product 35 parts of linseed oil fatty acid, 5 parts of Chinese tung oil fatty acid, 45 parts of dehydrated castor oil, 10 parts of fumaric acid, and 28 parts of phthalic anhydride were added, and then heated at 200° C. for 3 and one-half hours to obtain 207 parts of a resin having acid value of 42.5. To this resin 25 parts of triethylamine, 60 parts of butylcellosolve, and 140 parts of water were added to produce 432 parts of water soluble resin having 50.8% of non-volatile material, color number 15 (Gardner) pH 8.3 and viscosity $Z_5$ (by Gardner's air-bubble viscometer at 25° C.). 100 parts of this water soluble resin which was mixed with 1 part of Mn dryer (Mn 10%), was used in the electrodeposition coating under similar conditions described in Example 3. The resulting coated film was baked at 180° C. for 20 minutes to obtain transparent hard film with good gloss, adhesion, flexibility, and resistance to water and chemical reagents.

What we claim is:

1. A water soluble oil modified alkyd resin comprising less than about 50 weight percent of the total resin of the condensation product of an aromatic hydrocarbon-formaldehyde resin and a polyhydric alcohol, said alcohol being present in an amount sufficient to provide a total weight of hydroxyl groups at least 1.3 times the total weight of oxygen in said aromatic hydrocarbon-formaldehyde resin.

2. Water soluble baking coating material containing the water soluble oil modified alkyd resin according to claim 1.

3. A water soluble oil modified alkyd resin according to claim 1, wherein said polyhydric alcohol is at least one polyhydric alcohol selected from the group consisting of ethyleneglycol, polyethyleneglycols, propyleneglycol, polypropyleneglycols, butyleneglycol, polybutyleneglycols, neo-pentylglycol, glycerin, trimethylolethane, trimethylolpropane, pentaerythritol, dipentaerythritol, sorbitol, and manitol.

4. A water soluble oil modified alkyd resin as according to claim 1 wherein said aromatic hydrocarbon-formaldehyde is produced from an aromatic hydrocarbon having the formula:

$$X(R)_n$$

wherein X is selected from the group consisting of

and

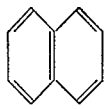

R is an alkyl having 1 to 3 carbon atoms and $n$ is an interger of 0 to 4.

5. A water soluble oil modified alkyd resin of claim 4 wherein said hydrocarbon is selected from the group consisting of benzene, toluene, xylenes, mesitylene, durene, ethylbenzene, isopropylbenzene, cymene, naphthalene and methylnaphthalene.

6. A water soluble oil modified alkyd resin according to claim 5, wherein said polyhydric alcohol is at least one polyhydric alcohol selected from the group consisting of glycol, polyethyleneglycols, propyleneglycol, polypropyleneglycols, butyleneglycol, polybutyleneglycols, neo-pentylglycol, glycerin, trimethylolethane, trimethylolpropane, pentaerythritol, dipentaerythritol, sorbitol, and manitol.

7. A water soluble oil modified alkyd resin according to claim 1, wherein the amount of the hydroxyl groups of the polyhydric alcohol is more than 160% by weight of the weight of the oxygen contained in the resin.

8. A process for making the water soluble oil-modified alkyd resin of claim 1 which comprises heating a first mixture consisting of an aromatic hydrocarbon-formaldehyde resin and a polyhydric alcohol, said alcohol being present in an amount sufficient to provide a total weight of hydroxyl groups at least 1.3 times the total weight of oxygen in said aromatic hydrocarbon-formaldehyde resin, in the presence of an acidic catalyst to produce a resinous product, heating a second mixture of said resinous product, a composition selected from the group consisting of drying vegetable oils, semi-drying vegetable oils and their fatty acid derivatives and at least one $\alpha$, $\beta$ unsaturated polybasic acid to obtain a resin composition having an acid value greater than 30 and neutralizing the resin composition with an alkaline material selected from the group consisting of inorganic hydroxides and water soluble amines.

9. The process of claim 8 wherein the amount of alcohol is sufficient to provide a total weight of hydroxyl groups greater than 1.6 times the weight of oxygen in said aromatic hydrocarbon-formaldehyde resin.

10. The process of claim 9 wherein said second mixture contains at least one polybasic compound selected from the group consisting of phthalic acid, phthalic anhydride, isophthalic acid, terephthalic acid, trimellitic anhydride, succinic acid, adipic acid, azelaic acid and sebasic acid and said $\alpha$, $\beta$ unsaturated acid is selected from the group consisting of maleic acid, fumaric acid, itaconic acid and 3,6 endomethylene-1,2,3,6-tetrahydro-cis-phthalic anhydride.

References Cited

UNITED STATES PATENTS

| | | | |
|---|---|---|---|
| 1,780,375 | 11/1930 | Bradley | 260—22 |
| 2,337,051 | 12/1943 | Kester | 260—67 |
| 2,806,834 | 9/1957 | Nischk et al. | 260—67 |
| 2,985,615 | 5/1961 | Tunteler | 260—67 |

FOREIGN PATENTS

| | | |
|---|---|---|
| 553,281 | 12/1956 | Belgium. |
| 863,505 | 3/1961 | Great Britain. |
| 889,633 | 2/1962 | Great Britain. |

DONALD E. CZAJA, Primary Examiner

R. W. GRIFFIN, Assistant Examiner

U.S. Cl. X.R.

117—132, 161; 204—181; 260—20, 21, 29.2, 32.4, 32.6, 33.2, 33.4, 67